United States Patent
Daringer et al.

[19]

[11] Patent Number: 6,050,394
[45] Date of Patent: Apr. 18, 2000

[54] COMPONENT MANUFACTURE AND OPERATION OF WOVEN-WIRE CONVEYOR BELTS

[75] Inventors: Ronald G. Daringer; Richard A. Loeffler, Sr.; H. William West, all of Cambridge, Md.

[73] Assignee: Maryland Wire Belt, Inc., Church Creek, Md.

[21] Appl. No.: 08/778,770

[22] Filed: Jan. 6, 1997

Related U.S. Application Data

[63] Continuation-in-part of application No. 08/363,332, Dec. 23, 1994, Pat. No. 5,590,755, which is a continuation-in-part of application No. 08/056,875, May 5, 1993, Pat. No. 5,375,695.

[51] Int. Cl.$^7$ .................................................. B65G 21/18
[52] U.S. Cl. ........................................... 198/778; 198/848
[58] Field of Search ..................................... 198/852, 853, 198/778, 848

[56] References Cited

U.S. PATENT DOCUMENTS

| | | | |
|---|---|---|---|
| 2,524,328 | 10/1950 | Platt et al. ............................... | 198/848 |
| 2,657,788 | 11/1953 | Merrill ..................................... | 198/848 |
| 2,859,861 | 11/1958 | Sheehan ................................... | 198/834 |
| 3,202,387 | 8/1965 | Andrews et al. ........................ | 198/848 |
| 3,731,894 | 5/1973 | Curran et al. ........................... | 198/848 |
| 4,345,730 | 8/1982 | Leuvelink ................................ | 198/853 |
| 4,346,138 | 8/1982 | Lefferts ................................... | 198/853 |
| 4,500,590 | 2/1985 | Smith ....................................... | 198/852 |
| 5,176,249 | 1/1993 | Esterson et al. ......................... | 198/850 |
| 5,375,695 | 12/1994 | Daringer et al. ......................... | 198/778 |
| 5,590,755 | 1/1997 | Daringer et al. ......................... | 198/778 |

FOREIGN PATENT DOCUMENTS

| | | | |
|---|---|---|---|
| 1385155 | of 1965 | France ..................................... | 198/778 |

*Primary Examiner*—Robert P. Olszewski
*Assistant Examiner*—Thuy V. Tran
*Attorney, Agent, or Firm*—Burns, Doane, Swecker & Mathis, LLP

[57] ABSTRACT

Drive and related travel tension is decreased at selected locations in special purpose travel paths for woven-wire conveyor belts enabling decrease in tensile strength requirements of metal wire components as assembled into a woven-wire belt. Connector rod configurations with varying depth seats, at selected locations for individual helically-wound loops of interacting spiral wires, provide for expansion of belt length at selected locations where needed to decrease or eliminate metal wire component strain. In unitary vertically-oriented lateral edge portions of an assembled belt during endless-belt travel about cylindrical configuration support rolls, travel tension is decreased by providing for added belt length of such unitary vertically-oriented lateral edge means as used for confining articles being conveyed; and, to provide more efficient and effective application of dynamic frictional drive forces along the length direction of travel of an elongated assembled belt in a travel path which is laterally-curved in relation to such length direction while maintaining a substantially-horizontal conveyance surface.

8 Claims, 8 Drawing Sheets

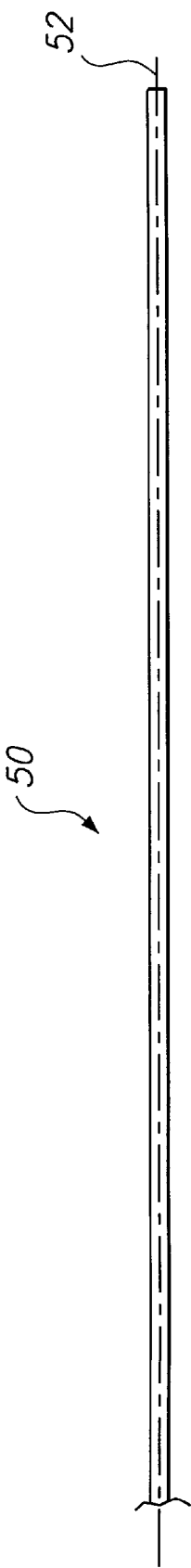
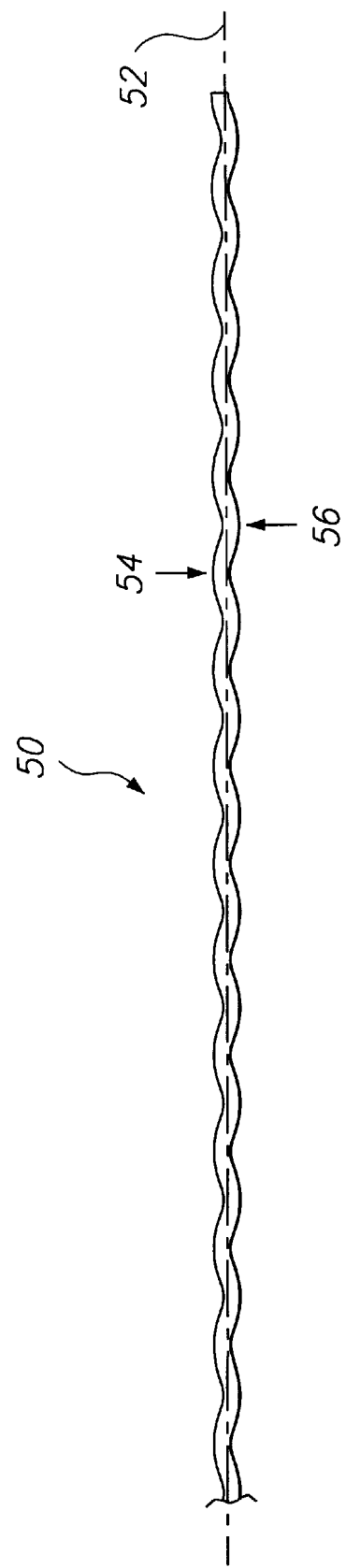

6,050,394

COMPONENT MANUFACTURE AND OPERATION OF WOVEN-WIRE CONVEYOR BELTS

RELATED APPLICATIONS

This application is a continuation-in-part of and co-owned U.S. patent application Ser. No. 08/363,332 filed Dec. 23, 1994, entitled WOVEN-WIRE BELT WITH VERTICALLY-ORIENTED LATERAL EDGES AND CONVEYANCE METHODS AND APPARATUS, now U.S. Pat. No. 5,590,755 which is a continuation-in-part of co-owned U.S. patent application Ser. No. 08/056,875 filed May 5, 1993, entitled CURVE-PATH WOVEN-WIRE BELT AND CONVEYANCE METHODS AND APPARATUS, now U.S. Pat. No. 5,375,695.

INTRODUCTION

This invention relates to fabrication of woven-wire belt components and assembly of woven-wire belts; and, more particularly, is concerned with configurations for metal wire components, for assembly of woven-wire belts, which substantially diminish tensile strength equipments for such belt components during selected types of belt operations. In its more specific aspects, this invention is concerned with methods and apparatus for fabricating such metal wire components, and types of woven-wire belt conveyance operations in which such components improve belt performance.

SUMMARY OF THE INVENTION

Tension stress along the length dimension of portions of an elongated woven-wire belt at certain locations in coacting metal wire components can, in certain types of curved path travel, produce metal strain and early fatigue. The invention discloses woven-wire belt connector rod configurations for coacting with helically-wound spiral wires to distribute or substantially eliminate drive and/or travel tensions in woven-wire belts in such travel paths which enables a decrease in the tensile strength requirements and enables a decrease in gauge and weight of metal wire components without corresponding decrease in load weight conveyance capabilities. Such connector rod configuration and coaction between connector rods and spiral wires enable expansion of belt length at selected locations in curved surface travel paths; and, provide for distribution of dynamic frictional drive force across the conveyance surface of a wire belt which is substantially horizontal in a travel path which is laterally-curved with respect to the length direction of an elongated woven-wire belt.

Operational efficiency of an assembled belt is enhanced and service life of a woven-wire conveyor belt, embodying the invention, is increased during operations in various types of special travel paths, including linear travel paths in endless-belt configurations with travel around cylindrical-configuration support rolls, laterally-curved substantially-planar travel paths, and in variations and combinations of such travel paths.

The above and other advantages and contributions are considered in greater detail during description of specific embodiments of the invention, as shown in the accompanying drawings.

BRIEF DESCRIPTION OF THE DRAWINGS

FIG. 2 is a plan view of rigid metal wire for initiating connector rod fabrication of the invention;

FIG. 3 is a plan view of a portion of an elongated connector rod for describing a first stage in one fabricating embodiment of the invention;

DETAILED DESCRIPTION OF THE INVENTION

Figure 1:
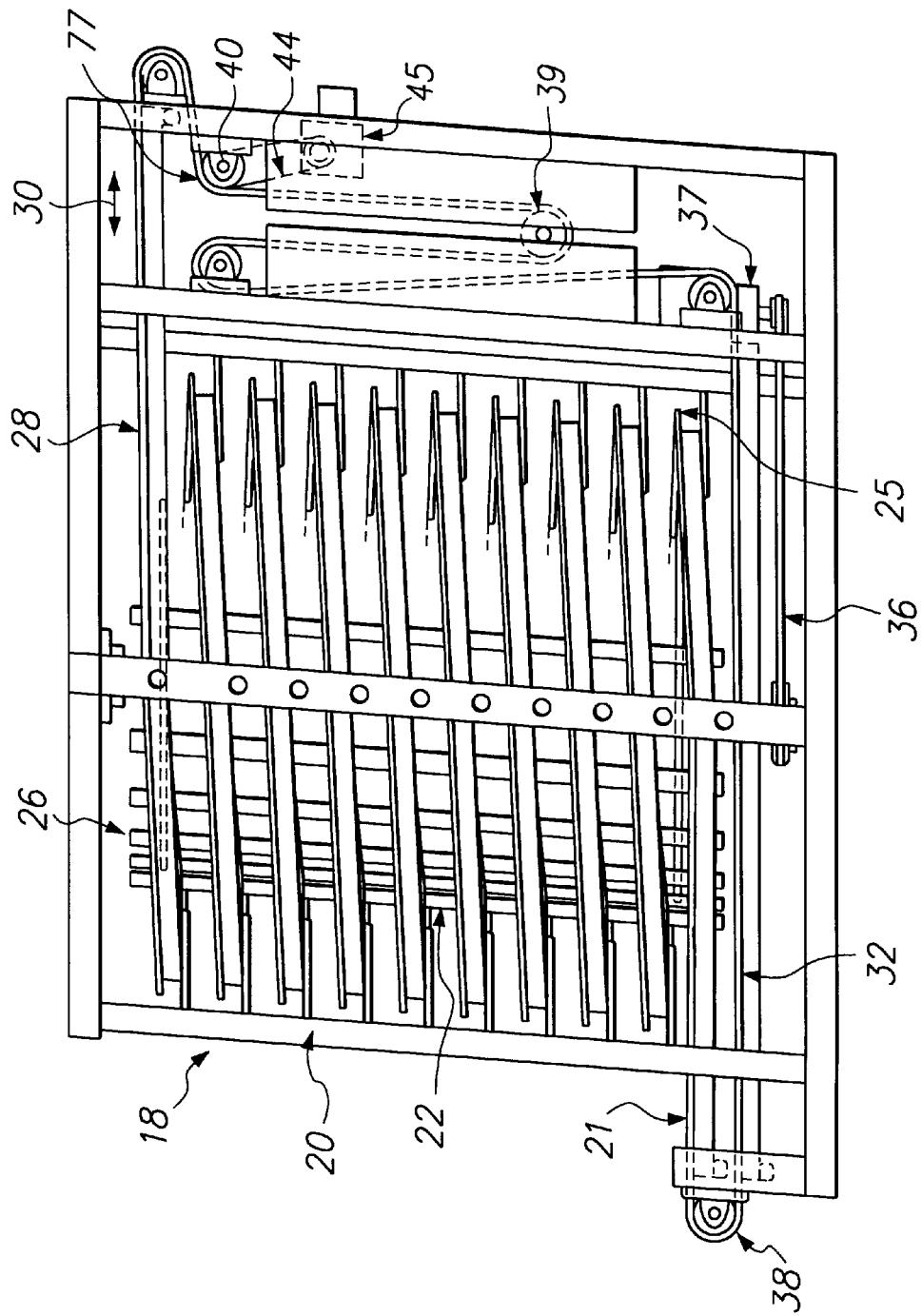
FIG. 1 is a schematic general arrangement elevational view, with portions cut away and portions in cross-section, of a conveyance structure, which combines multiple-layer laterally-curved travel paths and linear endless-belt travel paths for purposes of describing operations utilizing the present invention and for describing woven-wire belt sources of tensile stress overcome by the invention.

A plurality of travel paths, for description, are combined in structure 18 of FIG. 1 in which a woven-wire belt enters a treatment enclosure 20, from which portions have been cut away for clarity of illustration, along a substantially horizontal planar path 21. Such plurality of travel paths of the structure of FIG. 1, and control of drive rates in such a structure are described in the above parent application Ser. No. 08/363,332 which is included herein by reference, along with the increased wire gauge and other measures taken to extend belt life.

In an embodiment for describing the invention, a woven-wire belt enters along horizontal, planar linear travel path 21 and then travels in a laterally-curved travel path about a centrally-located drive tower 22. Such laterally-curved travel commences at a first lower level 25 in which the woven-wire belt moves into a helically-ascending travel path which includes a plurality of stacked levels. During such stacked helical-path travel, the belt is travelling about the central tower in a substantially-planar path which is substantially horizontal.

The invention enables distribution and a more efficient dynamic-frictional drive of the belt during travel about such central tower, while enabling a substantial decrease in tensile strength of metal wire components without decreasing conveyance load capabilities.

A cylindrical-configuration dynamic frictional drive surface is presented by vertically-oriented slats, such as 26, forming the outer peripheral surface of central drive tower 22. As indicated by arrow 30, the direction of drive through treatment structure 18 can be selected. In the embodiment shown, the belt exits from the central tower path along a horizontal, planar linear travel path 28. From that horizontal travel path, a return path for the belt is started in which the belt travels around horizontally-oriented cylindrical support and drive rolls toward a lower-level substantially-horizontal planar path 32, which returns the belt to the horizontal entry path 21, for reentry into the enclosed treatment portion 20 of structure 18.

The central drive tower 22 is rotatably driven, preferably from exterior to the treatment enclosure, by power transmission belt 36 which is powered by motor 37. After entry of woven-wire conveyor belt 38 into the treatment enclosure and, specifically, while in such plurality of stacked helically-curved layers, the belt is driven in the direction of its length by dynamic friction.

A unitary vertically-oriented lateral edge portion can more readily be provided to improve performance of the belt in its helical path, of FIG. 1, in accordance with the invention. The invention increases the efficiency of dynamic frictional drive for the belt, and can more readily be used to increase surface contact with the cylindrical-configuration outer drive surface of centrally-located drive tower 22.

A cylindrical-configuration outer drive surface for tower 22 can be presented in a number of ways; a plurality of vertically-oriented adjacent slats, such as indicated at 26, enables economic fabrication and presentation of a cylindrical drive surface which moves at a faster rate than the belt for dynamic frictional drive purposes.

During belt return travel from the exit level 28 of tower 22, woven-wire belt 38 moves about a plurality of horizontally-oriented cylindrical rolls, including a floating tension-control roll 39. In such return path, the woven-wire belt is driven in the direction of its length by drive roll 40 which is rotated by drive linkage 44; the latter is connected to and controlled by motor 45.

During such return, the central longitudinal axis of the conveyor belt, which is centrally located between lateral edges of the belt, remains in a single vertical plane while traveling along planar surfaces such as 21, 28, 32 and, also, while traveling around curved surfaces of the various horizontally-oriented cylindrical support, tension-control, and drive rolls.

The effectiveness and efficiency of assembled belt operations made possible by the invention extend to (i) linear travel paths in which the central longitudinal axis of the belt remains in the same vertical plane including, for example, belt travel around horizontally-oriented support rolls, (ii) laterally-curved travel paths during which the belt moves in a substantially-horizontal plane driven by dynamic friction, and (iii) variations and combinations of such linear and laterally-curved travel paths.

The linear speed of a belt in the return path of structure 18 of FIG. 1 is controlled by the rate of rotation of return-drive roll 40. Dynamic frictional drive in the helical path is, to a significant extent, controlled by the rate of peripheral movement of the central tower curvilinear surface, along with other later described factors which help to exercise control of the dynamic frictional drive force on the belt while in such laterally-curved travel path of the stacked layers.

Belt drive in the return path of structure 18 (FIG. 1) is separate and distinct from the dynamic frictional drive in the stacked-helical travel path.

Coordination of drive rates in the central tower and in the return path of structure 18 of FIG. 1 is described in reference to the above-identified copending and co-owned parent application Ser. No. 08/363,332, which is included herein by reference; for example, see figures numbered nine through twelve of such parent application and related description.

An important concept of the present invention is to be able to provide a unitary vertically-oriented lateral side portion for a belt for dynamic frictional drive along the inner peripheral edge of the belt, while in such helical travel path of the tower, without introducing belt component requirements because of endless-belt travel about a horizontally-oriented cylindrical roll.

The fabrication of connector rods with quantitatively-varying depth for seating a helically-wound loop of an associated spiral wire, as taught herein in relation to FIGS. 2–5, enables expansion of the length of a unitary belt at selected locations and decreases tensile strength requirements.

Elimination of prior concentrations of stresses, and decreasing possibility of strain to metal wire components, without increasing component wire requirements, will be better recognized from belt and conveyance operation descriptions in relation to FIGS. 6–9.

The tensile stress, and possible strain, in the outer radial portions of unitary vertically-oriented lateral edge at one or both lateral edges of a belt while circumscribing a portion of a cylindrical drive roll in an endless travel path can be seen in, and will be described in relation to, FIGS. 7, 8. Vertically-oriented lateral edge portions of a belt, for confining items being conveyed, in earlier development work by applicants' company (not yet made accessible in the industry or to the public) were made unitary with a belt to increase tensile strength of a belt during helically-oriented dynamic frictional drive (see parent application Ser. No. 08/363,332 in relation to description of Figure eight). However, return path cylindrical support roll travel caused tensile strain in such unitary vertically-oriented portions of a belt, requiring heavier gauge materials.

Quantitatively varying the depth of metal offset in a connector rod, to provide for preselected seating of individual helically-wound loops of interacting spiral wires, has eliminated that concern.

Figure 4:
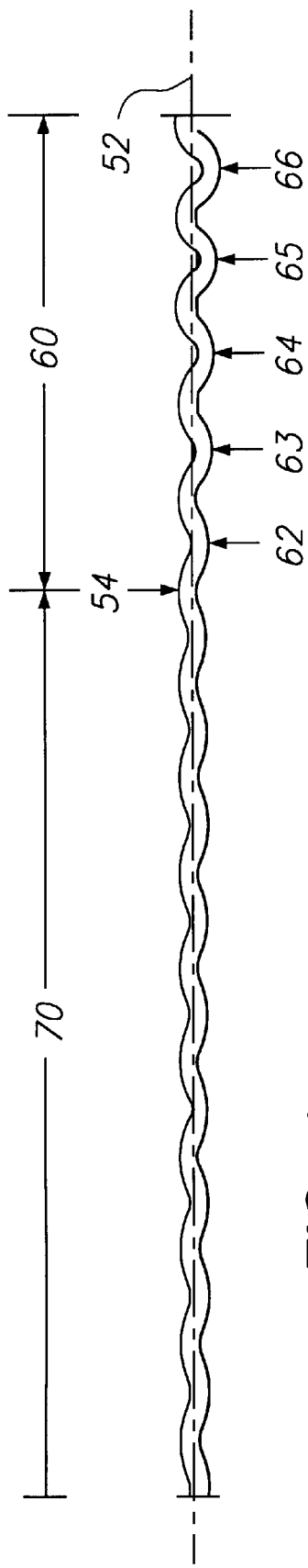
FIG. 4 is a plan view of the connector rod of FIG. 3 for describing a subsequent phase in such fabricating embodiment of the invention for describing application to a special type of curved surface travel.
Figure 5:
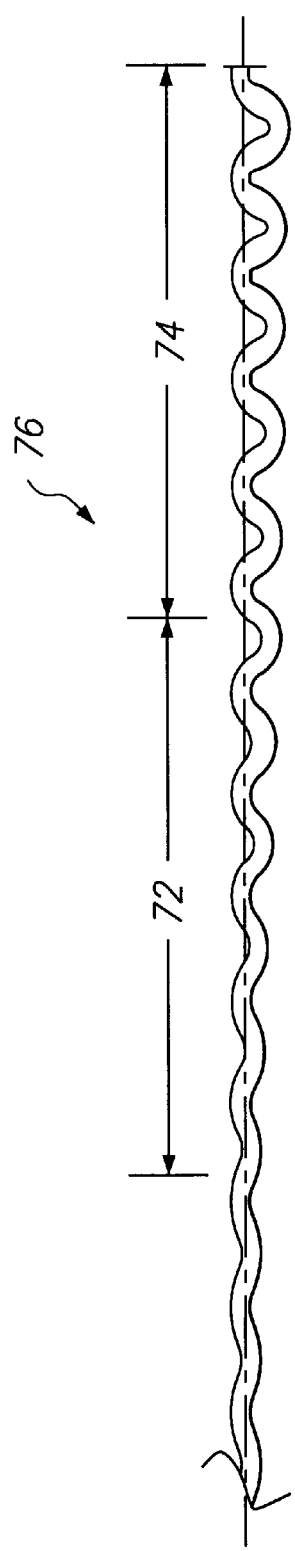
FIG. 5 is a plan view of a portion of an elongated connector rod for describing another application of the invention for assembly of and forming a woven-wire belt of the invention for special types of conveyance operations.

Seat locations are formed by offsetting rigid metal connector wire (FIG. 2) laterally with respect to its centrally-located axis, during fabrication of a connector rod as shown in FIGS. 3–5. The present invention quantitatively varies such lateral offset of connector rod metal selectively to provide for proper seating of helical loops of a spiral wire of an interacting integral unit. Such preselected positioning and quantitatively varying of lateral offset seat depth dimensions are preselected along the length of a connector rod for action along the width of an assembled belt and along a unitary vertically-oriented portion of the invention. Such unitary vertically-oriented edge portions of a woven-wire belt were especially subject to strain during belt travel around a horizontally-oriented curved support surface, such as a cylindrical roll.

During fabrication of a connector rod of the invention, the dimension of lateral offset is controllably varied at selected locations along the length of the rod. By increasing the lateral offset of metal, in relation to the centrally-located axis of the connector rod wire, the depth for properly seating a helically-wound loop is controlled and increased, expanding the length of the belt at selected locations.

Also, by quantitatively increasing the dimension of laterally-offset metal of connector rods of the invention, seating depths for helically-wound loops of interacting spiral wires are controlled at locations in the belt conveying surface which are contiguous to outer periphery belt edge portions and the dynamic frictional longitudinal drive tension can be distributed more uniformly across the width of the conveyance surface of the belt.

Methods of producing the new configurational aspects of connector rods of the invention are described in relation to FIGS. 2–5. Contributions of such new configurations are described with specific references to FIGS. 6–9 which present an assembled woven-wire belt of the invention traveling in such special types of conveyance travel as described in relation to FIG. 1. However, such advantages extend to variations of such specific types, for example, travel in a serpentine-type of horizontally-planar travel path with dynamic frictional drive along such travel path, or in structures having fewer types of belt travel than shown in FIG. 1, or which are limited to endless-belt travel.

The invention compensates for the increased travel length for a unitary turned-up vertically-oriented edge portion of a belt, at the increased radius circumference of travel around a horizontally-oriented support roll surface, by providing for selective expansion of the length of that portion of the belt as needed when increased length of travel of that portion of the belt is required to avoid tension strain in a vertically-oriented portion of the woven-wire belt of the invention. Component strain is eliminated by proper selection of lateral-offset seating depth for helically-wound loops of interacting spiral wire during travel of such unitary vertically-oriented edge portions around a curved surface, such as support roll in the return path of FIG. 1.

Referring to FIG. 2, connector rod metal wire 50 is substantially-symmetrical about centrally-located axis 52. Laterally offset locations provide for orderly seating of individual helical loops of a spiral wire, and such locations are established in an undulating manner along the length of an elongated connector rod. Laterally-offset depth portions of the rod are shaped for smooth seating of each respective helical loop of an interacting spiral wire, and are depicted in the portion of such a connector rod shown in FIG. 3.

Such undulating lateral offset portions can initially be formed in symmetrical relation to central axis 52, as shown at reference numbers 54, 56. Spacing of such offset portions is selected to correspond to the spacing of helically-wound loops of a coacting spiral wire; that is, to correspond to the "pitch" of the helical loops of spiral wires to be used.

Each single helically-wound loop of such a spiral wire will then be positioned, for orderly seating, in a location established by laterally-offset metal along the length of a connector rod, as described in relation to FIGS. 3–5.

Use of flattened surfaces in the spiral wires for seating with such undulating laterally-offset metal portions along the connector rod length increases seating surface area of a helically-wound loop and helps to diminish belt wear.

Varying the depth of a seating location, at selected positions along the length dimension of the elongated rod, facilitates desired belt travel for the special types of conveyance travel referred to above.

Referring to FIG. 3, metal offset to form a seat location can be measured from centrally-located axis (52) to seating surface of the wire for a helically-wound loop. Such metal is offset laterally with respect to the length direction of such central axis 52.

As shown in FIG. 4, metal offset for seat locations of increasing depth are formed along a length portion 60 of the connector rod which is contiguous to a longitudinal distal end of the connector rod. Note in FIG. 4 that the depth of lateral offset in portion 60 of the rod gradually (progressively) increases from lateral offset 62 through lateral offset 66. Such increasing depth lateral offsets are formed in one direction from central longitudinal axis 52.

In connector rod portion 70 of FIG. 4, located along the lengthwise central portion of the rod which will be located along the widthwise center of an assembled belt, the offset is predeterminedly uniform. Such uniform depth offset locations of connector rod metal, in such central portion 70 are of the same frequency and depth; and, cover a major portion of the width of an assembled belt which provides linear drive of an assembled belt. For example, during endless-belt travel, such as the return path shown in FIG. 1. Such widthwise central portion of a belt carries the longitudinal drive force, for example, supplied from drive cylinder 40 of FIG. 1. The quantitatively-varying offset locations 62 through 66 of rod portion 60 function in the unitary vertically-oriented edge portion for endless-belt travel around a curved support means, or can be positioned in the lateral portion of the conveyance portion of a belt as described later.

Provision is made in FIG. 5 for a differing embodiment of the invention progressively quantitatively varying the depth of laterally-offset metal over an extended lateral portion, which can provide for seating individual helical wraps in two separate sections, 72, 74 of connector rod 76.

The connector rod embodiment of FIG. 5 is used during assembly of a load-confining belt in which portions of the unitary belt itself, free of use of non-unitary means, will provide for confinement of items being conveyed; and which can be used in dynamic frictional drive embodiments, without relying on strength characteristics of the vertically-oriented edge(s). Where such unitary confinement means are to be provided in a manner which does not interfere with conveyance operations of the belt for linear travel paths, the connector rod embodiment of FIG. 4 is preferred.

For travel in a dynamic frictional drive helically-oriented travel path, a lateral side portion of a unitary belt is vertically-oriented; such woven-wire belt is assembled utilizing a connector rod, as shown in FIG. 5. An extended length of such rod, from its lengthwise central section, laterally offsets metal of increasing depth at each location in approaching one (or both) lateral distal end(s) of the rod. Such extended length portion serves two purposes in a central tower dynamic frictional drive structure as shown in FIG. 1, and is described in more detail in relation to FIGS. 6 and 9.

Referring to FIG. 5, the varying depth portion 72 is disposed to be contiguous to a lateral edge of the conveyance surface of an assembled woven-wire belt. Section 74, which continues such previously increasing depth, is disposed to be in a turned-up vertically-oriented edge portion for confining product on the belt during treatment. Each provides its own varying depth seat locations which serve special functions in an assembled belt for a plurality of special types of travel paths, such as encountered in the structure shown in FIG. 1.

Figure 6:
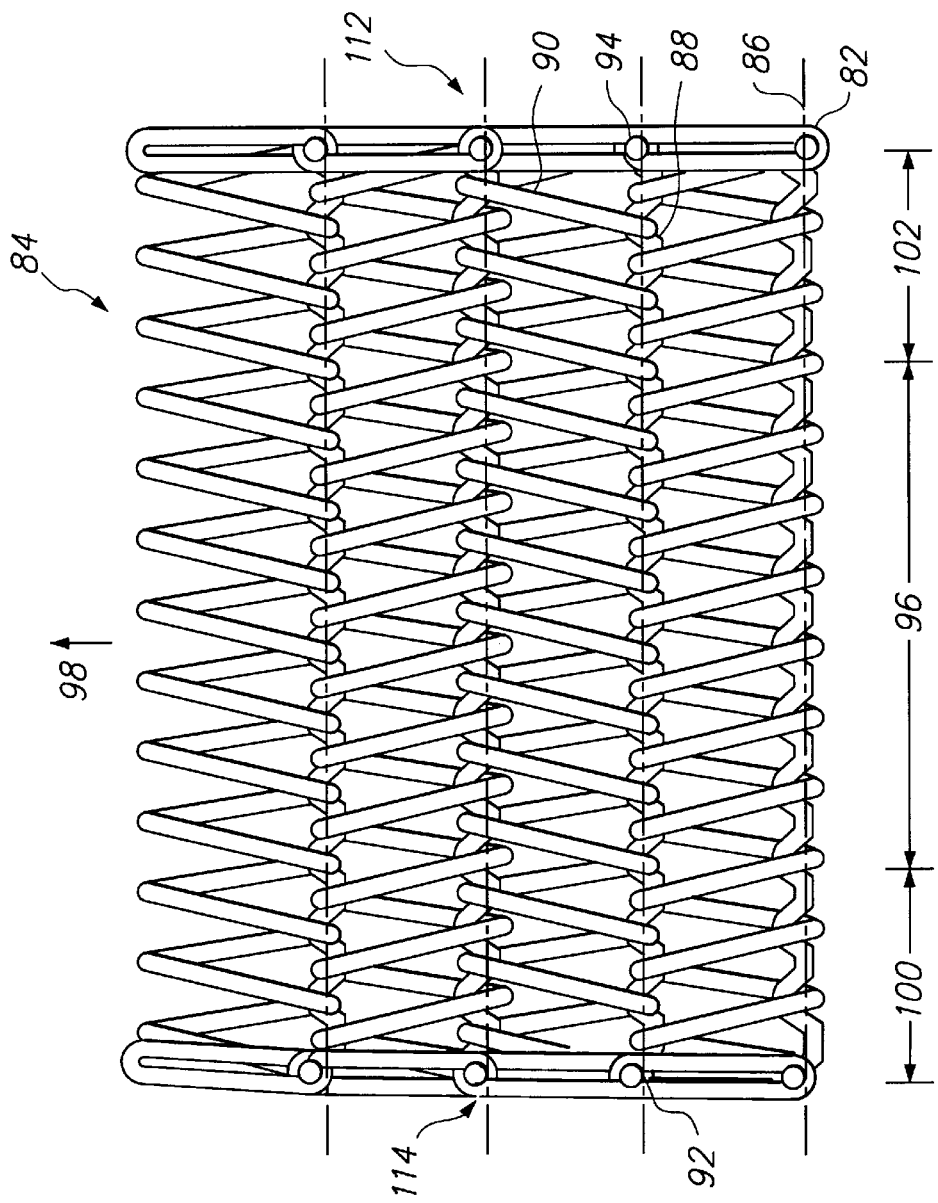
FIG. 6 is a plan view of a portion of a unitary elongated woven-wire belt of the invention for describing assembly of individual connector rods and spiral wires into integral units of a unitary woven-wire belt, and interacting of such integral units during travel in the length direction of an elongated belt.

A plan view of a conveyance surface of an assembled belt is best seen in FIG. 6. Vertically-oriented lateral edge portions are better seen, and later described, in relation to FIGS. 7, 8.

In forming integral units of a woven-wire belt, each spiral wire, such as 90 (FIG. 6), is made unitary at each of its distal ends, e.g. by welds such as 92, 94, or by brazing, to form an integral unit. A woven-wire belt, as shown in FIG. 6, is assembled by interlinking such integral units with each such next-adjacent interacting integral unit; integral units are described in more detail in parent application Ser. No. 08/363,332 in relation to Figure five.

Figure 9:
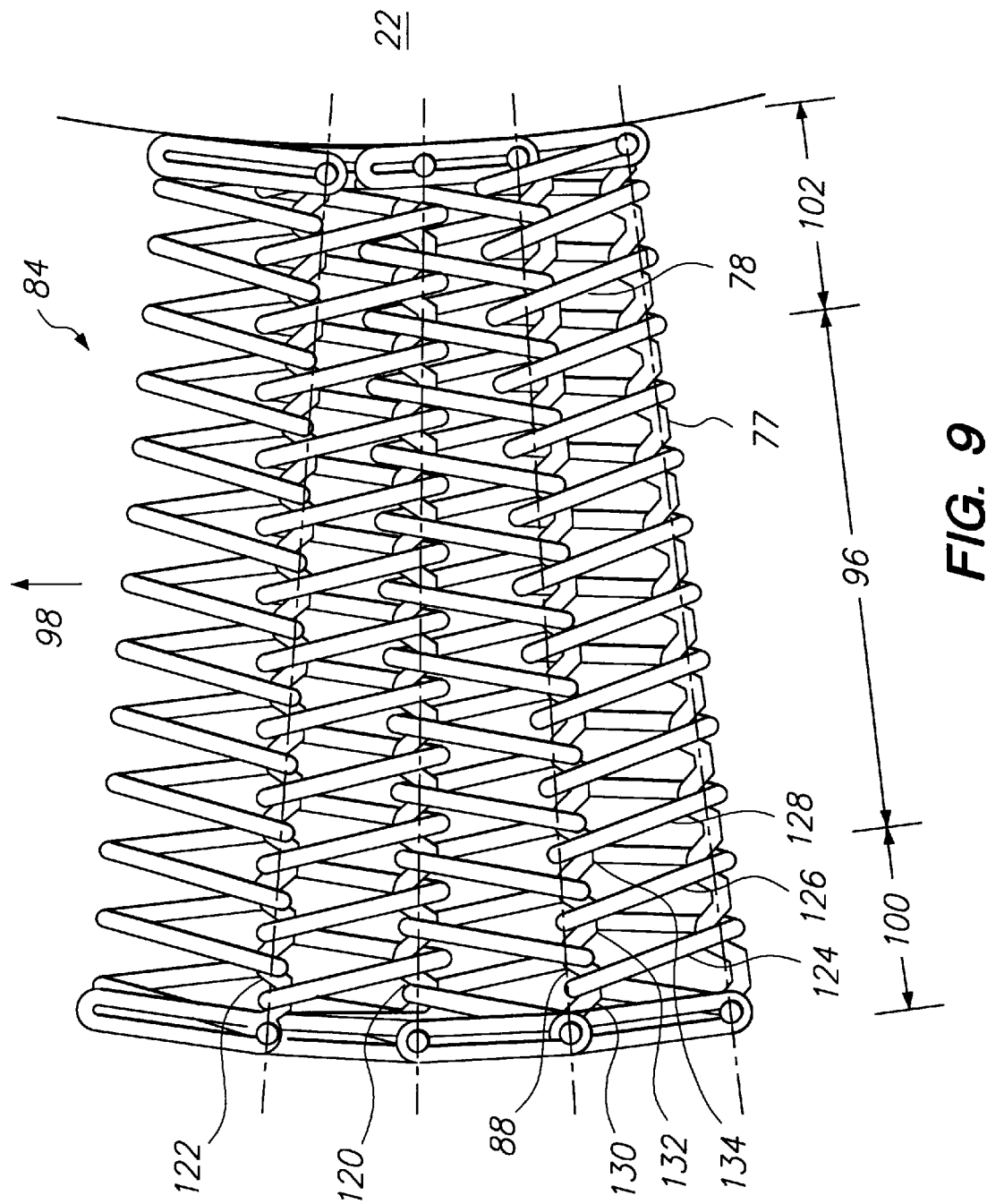
FIG. 9 is a plan view of a portion of a unitary elongated assembled belt embodiment of the invention for describing belt component interaction, made possible by the invention, during special-purpose conveyance operations, when such belt is moving in a substantially-planar horizontal travel path which is laterally-curved in relation to the length direction of such elongated woven-wire belt.

As taught herein, when a woven-wire belt is driven in a laterally-curved substantially-horizontal path about central drive tower 22 (FIG. 1), lateral edge portions of integral units of such belt are collected to a maximum extent in the conveyance surface contiguous to the inner periphery of the belt. Such collection, along such inner periphery, also includes any unitary vertically-oriented belt edge portion, as shown in FIG. 9; such a vertically-oriented inner periphery belt contacts the vertically-oriented cylindrical drive surface of central tower 22.

In development of a workable belt, as described in parent application, the dynamic frictional drive force was concentrated solely in the outermost helically-wound loop, in such conveying surface, of each integral unit spiral wire. Solely those loops carried the lengthwise force, produced by dynamic friction, for the entire belt. And it was necessary to increase the gauge, weight and tensile strength of the metal wire components and take other measures to help absorb such drive force.

The invention distributes such dynamic frictional lengthwise drive force laterally across a selected width portion of the conveying surface of a belt assembled as taught herein.

In linear travel paths of the belt, such as while being drive by roll 40 of FIG. 1, centrally-located helical loops of the spiral wires are seated; that is, along the central width portion 96 (FIG. 6) of the belt. Travel is in the length direction of the elongated belt, as indicated by arrow 98; and, during such linear travel, helically-wound loops of the spiral wires in such widthwise central portion of the belt uniformly carry the drive force for the belt. Each interacting spiral wire loop, which is located widthwise in the central belt section 96, is seated in contact with a connector rod (such as 88) of a lengthwise adjacent integral unit. The loops at lateral edge portions 100, 102 (FIG. 6) are not fully seated and do not carry such linear drive force.

Referring to the two sections 72, 74 of FIG. 5, each with progressively increasing offset depth locations in the embodiment of FIG. 9, each such section has separate utility. Section 72 of FIG. 5 remains in the widthwise conveying surface during assembly of a woven-wire belt, contiguous to a lateral edge conveying portion of the belt.

Rod section 74 is part of the upwardly-turned unitary vertical edge portion of the belt, along with loops of associated spiral wires. The action of those vertically-oriented portions during linear planar, and curved surface, endless belt travel are best seen in FIGS. 7 and 8.

Figure 7:
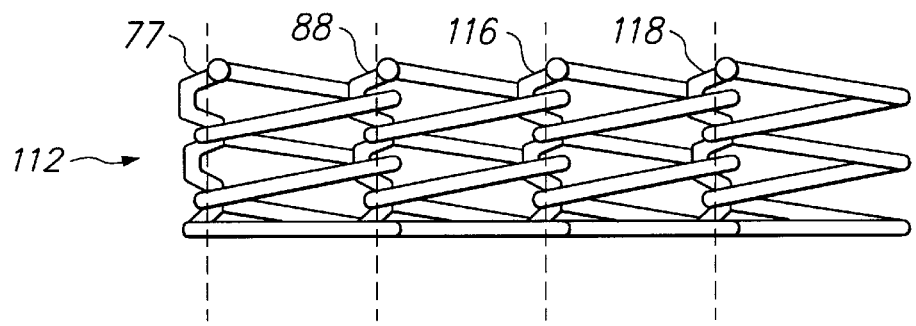
FIG. 7 is an enlarged side elevational view for describing a vertically-oriented unitary lateral edge portion of such woven-wire belt of the invention for use for conveyance operations as referred to in FIG. 4.

Referring to FIG. 7, vertically-oriented lateral-edge section 112 is shown during linear travel in a horizontal plane. The helical wire loops of belt section 112 are not seated above the level of the conveyance surface during such linear planar travel of the belt. In accordance with the invention, turning-up of a vertically-oriented lateral edge section, such as 112 of FIG. 7, takes place along the length of each connector rod, at the location indicated where sections 72 and 74 meet in FIG. 5, after the earlier-described integral units and wire belt are assembled.

In FIG. 7, the axes of the connector rods are parallel to each other and are perpendicular to the planar horizontal travel path. The progressively increasing offset depth, as described in connector rod section 74 of FIG. 5, provides for increasing belt length within the unitary vertically-oriented belt section 112, when called upon for increasing radial distance travel about a cylindrical-configuration support or drive surface; that is, during endless-belt travel around a curved surface.

Figure 8:
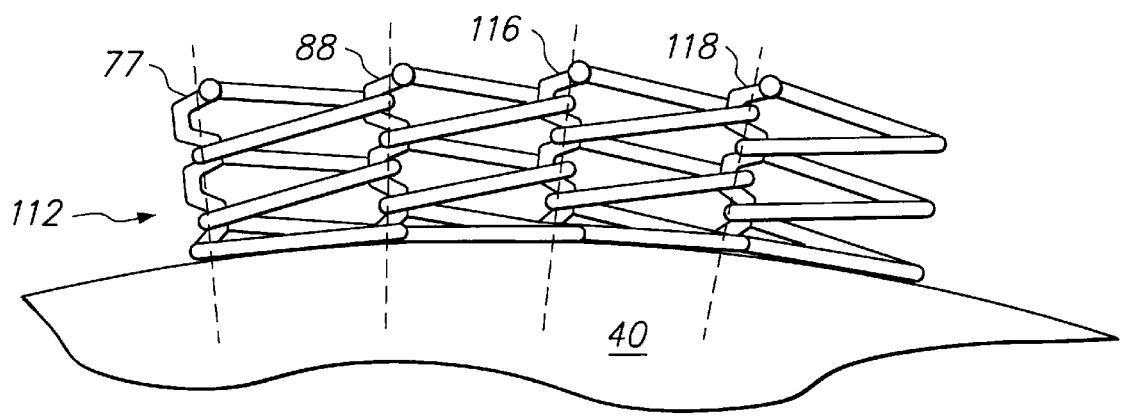
FIG. 8 is a side elevational view of such vertically-oriented unitary lateral edge portion of FIG. 7 for describing interaction of connector rod and spiral wire integral units of the invention providing for expansion of the length of such unitary portion of an assembled wire belt during travel around a curved-surface support, in which the central longitudinal axis of the belt remains in the same vertical plane, such as occurs in endless-belt travel about a cylindrical-configuration support roll which is horizontally-oriented.

Such curved-surface endless-belt linear travel is shown in FIG. 8. The interacting helical wire loops in vertically-oriented section 112 seat without tension stressing of those loops (or the rod), notwithstanding the increased travel distance as radial distance from the cylindrical surface of roll 40 increases. At such selected locations, the unitary woven-wire belt increases in length, avoiding tension stressing. During such curved-surface endless-belt travel, around a horizontally-oriented roll, the axes of the connector rods are no longer parallel to each other.

Longitudinal drive continues to be transferred from drive roll 40 through the widthwise central section belt 96 (of FIG. 6), while the lengthwise central axis of the belt remains in the same vertical plane. That is, during both linear planar travel as shown in FIG. 7 and during endless-belt curved surface travel as shown in FIG. 8.

However, when the belt enters a travel path which is laterally-curved with respect to the length direction of an elongated belt, for example, for dynamic frictional drive in the stacked helically-oriented travel path of the tower portion of conveyance structure 18 of FIG. 1, the relative positioning, across the belt width, of the helically-wound loops and connector rods of adjacent integral units differ across the conveying surface.

Reference is made to the plan view of the conveyance surface of FIG. 9, the belt is near horizontal in such a stacked helically-oriented travel path. During such horizontal substantially laterally-curved travel, adjacent integral units can be collected within and in relation to each other in the lengthwise direction of the belt. Such integral units are collected, to a maximum extent, contiguous to the inner periphery after conveying surface width belt section 102. A unitary vertically-oriented lateral edge portion, at the inner periphery of the belt, is being driven by dynamic frictional contact with the cylindrical-configuration drive surface of rotatably driven central drive tower 22.

Such lengthwise direction collection of woven-wire belt integral units takes place upon entry into such laterally-curved multi-layer stacked helical path; and, linear travel is restored upon exit from such cylindrical drive path, with an orderly seating of loops and associated spiral wires which is augmented by the coordinated spacing (pitch) of the loops and laterally-offset locations, as described earlier.

Differing problems from those discussed in relation to FIGS. 7, 8 are solved by the invention during dynamic frictional drive in laterally-curved helically-oriented travel path. Referring to FIG. 9, such maximum collection along such inner periphery of laterally-curved travel path diminishes gradually in moving radially outwardly, widthwise of the belt along the conveying surfaces, from such cylindrical-configuration drive surface. But, the present invention presents such collection and enables dynamic frictional drive force to be selectively distributed across the width of the belt conveying surface, from such outer periphery toward the inner periphery. Also, it is not necessary to rely on a unitary vertically-oriented outer portion to assist in dynamic frictional conveying drive force.

Fabricating connector rods with lateral offsets with varying depth of seating for a helically-wound loop of an interactive spiral wire by progressively decreasing such depth from such outer periphery toward the inner periphery, for example, as shown by rod section 72 of FIG. 5, provides a solution to distribution of such drive force; and the length of distribution can be selected.

Dynamic frictional drive force, in the lengthwise direction of the belt, is thus distributed toward the inner periphery over a plurality of widthwise-located loops of the spiral wires. Such distribution selection takes place over belt section 100 of FIG. 9. As shown, such drive force is distributed widthwise in three spiral wire loops 124, 126, 128, as shown in FIG. 9, in varying depth locations 130, 132, 134. Such a distribution of drive force by interacting integral units takes place throughout the length of the unitary belt while in such fictionally-drive laterally-curved helically-oriented drive path. Such distribution of drive force removes a concentration of drive force from the outer peripheral edge and distributes it inwardly. Belt travel is augmented, and tensile strength of metal wire components can be decreased.

More uniformly distributing lengthwise direction drive force in the product-carrying conveyance surface also improves the transfer of the constriction force, sometimes referred to as gripping force, of the belt on the cylindrical-configuration drive surface of central drive tower 22. Also, distribution of the dynamic frictional drive force more uniformly eliminates, or substantially decreases, the opportunity for "bowing" (or bending) of connector rods, which was determined to be a potential for introduction of a fatigue factor and required heavier gauge connector rods.

Selecting proper connector rod offset depths and resulting distribution of longitudinal-drive tension widthwise in the assembled belt, as set forth above, provides increased woven-wire belt life by significantly decreasing the magnitude of lengthwise drive stress in each helically-wound loop and connector rod of woven-wire belts during the described operations, helps to eliminate, or significantly decrease, related metal fatigue or repair requirements, and enables use of lower gauge lighter weight components.

The number of offset locations of progressively increasing depth is selected in belt sections by taking into consideration the diameter of a horizontally-oriented cylindrical drive surface and/or the desired distribution of longitudinal-drive tension when the belt is in laterally-curved dynamic frictional drive travel path.

In a specific embodiment of the invention, the gauge and physical characteristics of the spiral wires and connector rods are preselected. Shaping of offset locations starts with forming uniformly-spaced, uniform-depth offsets, lengthwise of a connector rod, along its length. Such forming results in a uniform pattern along the longitudinal axis, as shown in FIG. 3.

Figure 10:
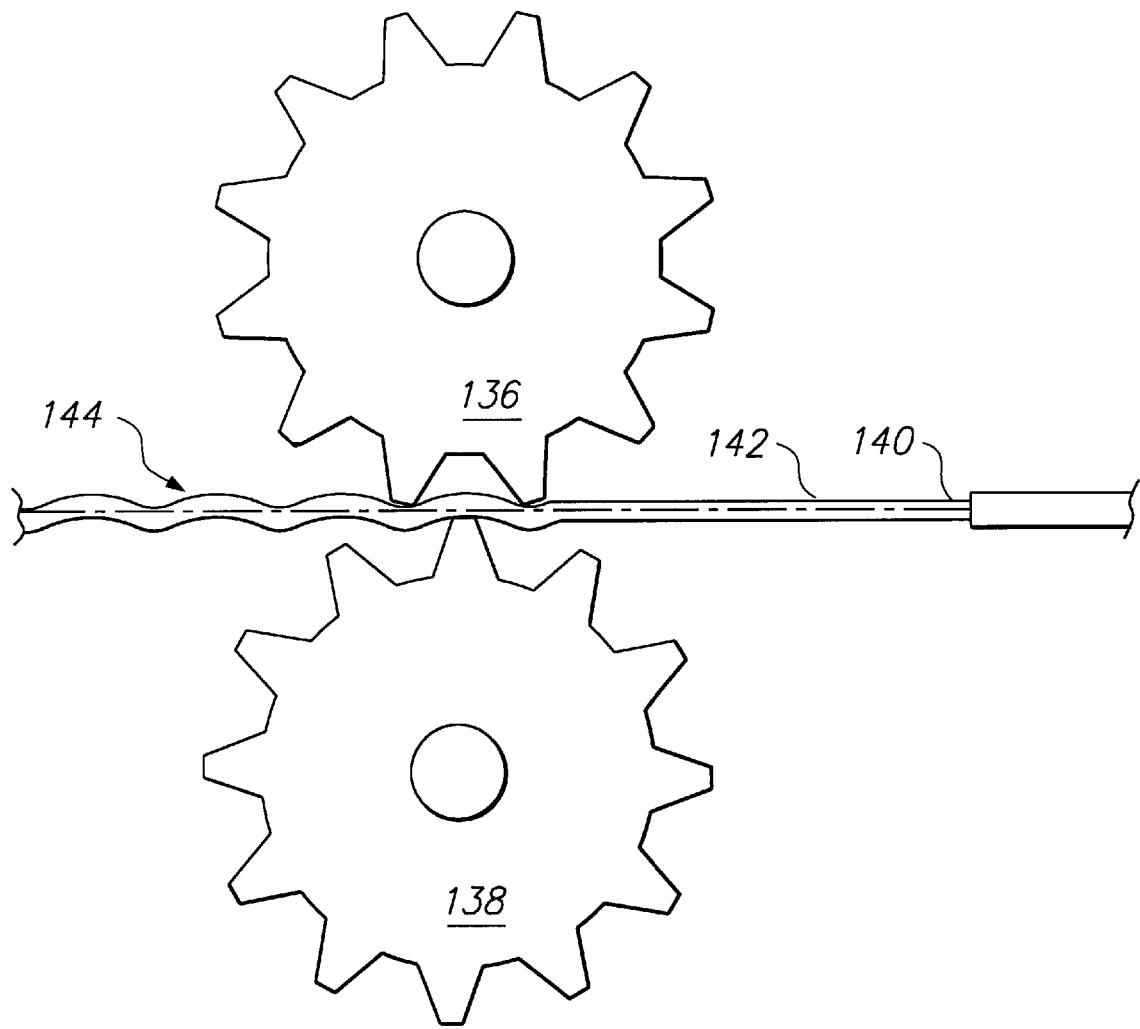
FIG. 10 is a schematic elevational view of a specific embodiment of apparatus for describing a fabricating stage during manufacture of a connector rod of the invention.

In a specific embodiment, apparatus for such forming of rigid connector rod wire, as shown in FIG. 10, includes rotatable crimping wheels 136, 138 for pre-forming connector rod wire 140 of selected physical and gauge characteristics. Initially, the rod metal is offset from axis 142 (shown in interrupted lines) at uniformly-spaced locations. More specifically, connector rod 144 is preformed by laterally offsetting metal a uniform amount at locations spaced uniformly along the axis 142.

In a specific embodiment of an assembled woven-wire belt referred to above, such uniform offset depth is maintained at a widthwise central section of the belt. Connector rod metal contiguous to one or both distal ends of the rod is reshaped, dependent on intended types of belt travel.

Figure 11:
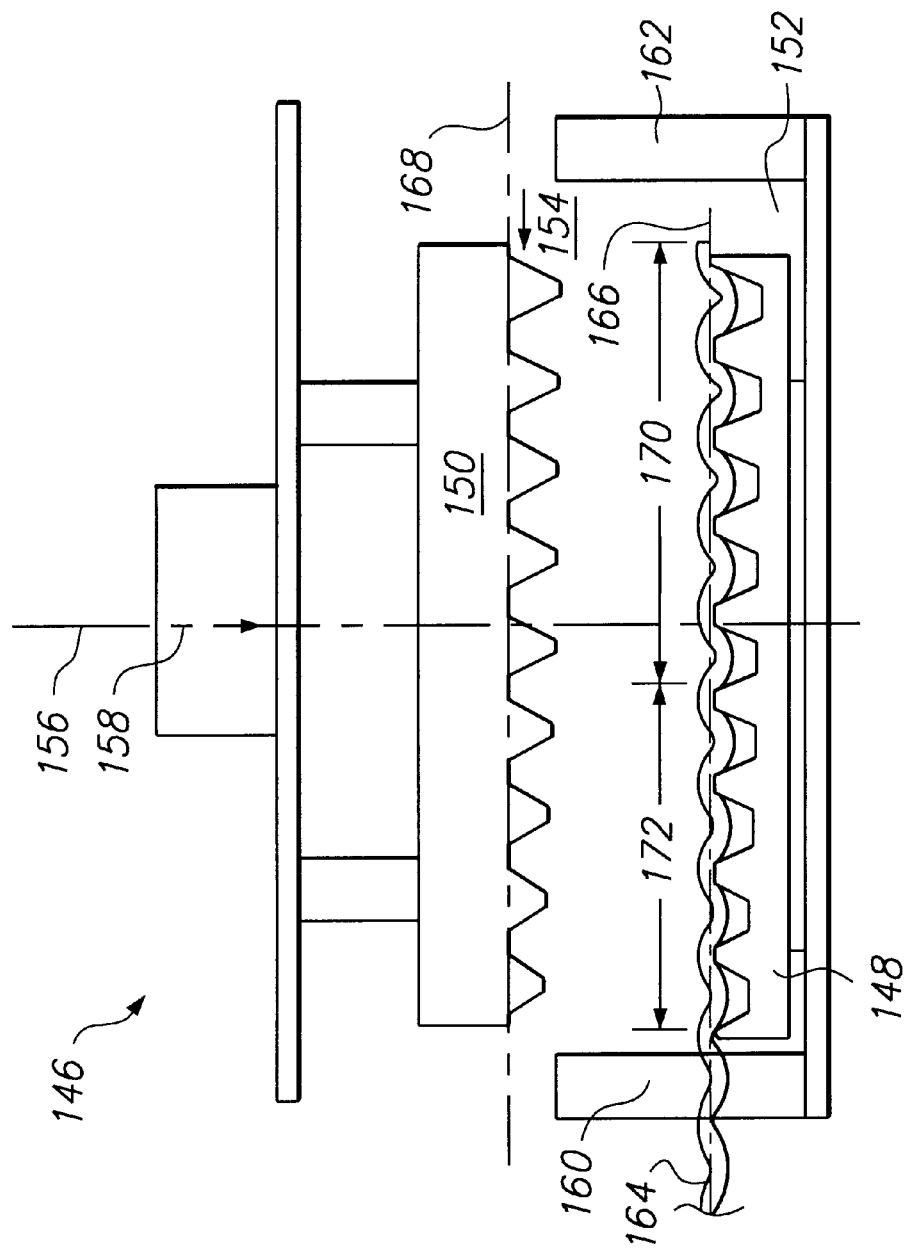
FIG. 11 is a schematic elevational view of additional apparatus utilized in the embodiment of FIG. 10 for describing a subsequent fabricating stage in producing connector rods of the invention.

In a second stage of a rod fabricating embodiment, apparatus for reshaping connector rod metal at selected locations is shown in FIG. 11. Without changing the uniform lengthwise spacing of seat locations along the axis of a connector rod, progressively increasing-depth offsets are formed in the rod for location at a lateral portion, or portions, of the conveying surface of a woven-wire belt; and/or for unitary vertically-oriented lateral side portions of an assembled belt.

The uniformly spaced offset locations shown in FIG. 10 are selected in accordance with the pitch of the spiral wires being used; that is, the number of interacting helical loops per unit length of a spiral wire. In fabricating belt components of the embodiment of FIGS. 6–9, offset locations for the connector rods and the pitch of the spiral wires are selected with the same uniform spacing; and, such uniform spacing extends across the widthwise dimension of a woven-wire belt assembled in accordance with the invention.

Locations for reshaping such rod offset locations are selected contiguous to a distal end portion, or portions, of the rod for the special types of belt travel described. A connector rod press has been developed for increasing the offset depth a selected amount, at such selected locations, and for providing the progressively increasing depth for the purposes described above. A schematic general arrangement of a specific embodiment of such press is shown in FIG. 11. Press 146 presents a stationary jaw 148 and movable jaw 150. Each such jaw has reshaping tooling, such as 152 and 154, respectively, located for intermeshing engagement at preformed uniformly spaced locations. Such jaws, with reshaping tooling, separated prior to a work stroke, are positioned for movement along press axis 156. The work stroke travel direction of movable jaw 150 is indicated by arrow 158. Stop means, such as stop blocks 160 and 162, limit the travel of movable jaw 150.

The horizontally-oriented distal end tooling surfaces of section 154 of movable jaw 150, help to establish a flat portion at each seat depth for receiving a flattened surface of a helically-wound loop.

Providing progressively increasing-depth offset locations for the embodiment of FIG. 5 is accomplished by providing press jaws having forming sections of progressively increasing depth dimension; in FIG. 11 each such tooling location provides progressively increasing depth lateral offsets of metal for a lateral edge section of the conveying surface and/or for a vertically-oriented section of a belt; and, such varying depth offsetting can be provided at each lateral edge of a connector rod by an added action of the apparatus of FIG. 11 near a remaining lengthwise end after establishing such increased depth locations near a first lengthwise end of a rod.

Other means of achieving such uniform spacing and uniform depth locations, in combination with progressively increasing locations, for example, by utilizing programmed machining, are within the scope of the invention.

The following tabulated data pertain to metal wire components and assembly of woven-wire belts for the special types of travel paths described above.

| TABULATED DATA | |
|---|---|
| Belt length | 110 feet |
| Cylindrical-configuration drive tower 22, diameter | 26 inches |
| Number of circumscribing turns | 9 |
| Spiral wire (gauge) (ASME J-304 stainless steel) (steel or other wire alloy, aluminum, brass, coated steel, or other suitable conveyance wire material) | 20 to 8 .0348"–.1626" |
| Connector rods (gauge) (ASME J-304 stainless steel) (steel or other wire alloy, aluminum, brass, coated steel, or other suitable conveyance wire material) | 16 to 6 .0625"–.192" |
| Connector rod length | 25 in. |
| Offset connector rod metal locations per unit belt-width | 21 per ft. |
| Uniform offset depth of connector rod for use at widthwise central section of belt (FIG. 6) | .180 in. |
| Dimension of widthwise central belt section 96 (FIGS. 6, 9) | 13 in. |
| Quantitative progressive increase of offset depth at lateral sections of connector rod (FIGS. 6, 9) | .008 in. |
| Dimension of each connector rod section 100, 102 of FIGS. 6, 9 (widthwise of belt) | 4.5 in. |
| Progressively increasing offset depth for vertically-oriented lateral edge sections | .015 in. |
| Height of vertically-oriented section 112 of FIGS. 7, 8 | 1.5 in. |
| Ratio of maximum depth of lateral offset to wire diameter | 2 |

Connector rod configurations, other than those described in the specific embodiment, can be devised, using the above description, to meet industrial conveyance needs. Other embodiments can include variations in the dimension of vertically-oriented edge portions, and the depth and locations of specially shaped offset locations to best provide for specific belt travel paths. For example, assembled belts for solely endless-belt travel paths, free of vertically-oriented belt sections, could preferably use a fixed minimal depth of crimp near each lateral edge of the conveying surface to improve straight line tracking of an assembled belt. Or, a graduated progressive change in depth of offset, from the widthwise center, toward each lateral edge of an assembled belt, could provide for more efficient serpentine travel between work stations along a single level working area.

Modifications in materials, dimensions, configurations, processing steps or belt arrangements, other than those set forth in describing a specific embodiment, are, in the light of the above teachings, within the reach of those skilled in the art without departing from the disclosed inventive concepts. Therefore, it should be understood that the scope of the invention is to be determined by taking into consideration the scope of the appended claims in combination with the above disclosure.

What is claimed is:

1. A method for diminishing tensile strength requirements of metal wire components of a woven-wire belt assembled for use in a curved travel path having a radial inner curved path and a radial outer curved path, a lateral edge portion of the woven-wire belt adjacent the inner curved path defining an inner edge portion of the woven-wire belt and a lateral edge portion of the woven-wire belt adjacent the outer curved path defining an outer edge portion of the woven-wire belt, said method comprising:

fabricating elongated connector rods for the woven-wire belt so as to provide an individual seat location for individual helically-wound loops of interacting spiral wires, wherein said fabricating step includes forming uniformly spaced seat locations with progressively increasing depth in a selected portion of said rod positioned toward only one longitudinal end of said rod, said only one end of said rod being disposed on the outer edge portion of the woven-wire belt.

2. The method of claim 1 wherein said curved travel path is selected from the group consisting of:

(A) dynamic frictional drive force along a lateral edge of such belt, (B) endless-belt travel about a curved support surface, and (C) combinations of (a) and (b).

3. The method of claim 1 wherein said step of fabricating elongated connector rods includes:

providing elongated rigid metal wire of preselected physical characteristics and substantially uniform gauge with respect to its centrally-located axis;

establishing an elongated connector rod of predetermined length from said wire;

laterally-offsetting metal of said connector rod wire from the centrally-located axis at a plurality of locations spaced lengthwise along said elongated connector rod length to provide for said individual seat locations during woven-wire belt assembly and operation of individual helically-wound loops of an associated spiral wire, and quantitatively varying the lateral offset of connector rod metal, from the centrally-located axis, at predeterminedly selected locations along said connector rod so as to provide said seat locations with progressively increasing depth.

4. The method of claim 3 further comprising selecting the belt assembly from the group consisting of:

a belt assembly presenting a unitary vertically-oriented portion along a single lateral edge of such elongated conveyance surface, and a belt assembly presenting a unitary vertically-oriented portion along each lateral edge of such elongated conveyance surface; and wherein forming of each such unitary vertical edge portion is carried out after assembly of such elongated belt by interconnecting woven-wire connector rods and spiral wires to form a unitary assembly.

5. The method of claim 3, further comprising:

laterally-offsetting connector rod metal to provide substantially uniform dimension seat locations along a longitudinally-extending central portion of said elongated connector rod, so as to provide for carrying out linearly-directed drive of the woven-wire belt assembled from said plurality of connector rods and helically-wound spiral wires when the assembled belt is in a linear travel path.

6. The method of claim 5, wherein quantitatively-varying lateral offset of connector rod metal provides seating locations for helically-wound loops of associated spiral wires which progressively increase depth in approaching said only one longitudinal end of said connector rod, so as to enable increasing belt length along a unitary vertically-oriented portion of an assembled belt during travel around a curved surface support in which the central axis of the belt remains in the same plane.

7. Method for manufacturing a woven-wire belt from elongated connector rods, and elongated metal spiral wires presenting helically-wound loops, comprising:

(A) providing elongated rigid connector rod metal wire of preselected physical characteristics and substantially uniform gauge with respect to a centrally-located axis;

(B) forming said rigid connector rod wire into a plurality of elongated connector rods, each said connector rod being formed to define a plurality of laterally offset metal locations which are uniformly-spaced lengthwise of said elongated rod, each said offset metal location being spaced along said elongated connector rod to provide seating for a single helically-wound loop of an associated spiral wire during assembly and operation of said belt, said connector rod metal being uniformly laterally-offset, from the centrally-located axis of said connector rod wire, along a lengthwise central portion of each said elongated connector rod, as assembled into a woven-wire belt for conveyance operations, and with quantitatively increasing laterally-offset metal progressively in a portion contiguous to at least one lateral edge of such a connector rod;

(C) providing a plurality of elongated spiral wires, of presented length, with helically-wound loops spaced uniformly along the length dimension of each said elongated spiral wire, and (D) assembling said connector rod and spiral wire components with an individual helically-wound loop of each said associated spiral wire being aligned for seating in an individual laterally-offset metal location along a respective connector rod so as to form the woven-wire belt for use in a curved travel path having a radial inner curved path and a radial outer curved path, a lateral edge portion of the woven-wire belt adjacent the inner curved path defining an inner edge portion of the woven-wire belt and a lateral edge portion of the woven-wire belt adjacent the outer curved path defining an outer edge portion of the woven-wire belt, wherein said portion of said connector rod having said quantitatively increasing laterally-offset metal is disposed only along said outer edge portion of the woven-wire belt.

8. A connector rod for use with a rigid metal spiral wire during assembly of a woven-wire belt assembled for use in a curved travel path having a radial inner curved path and a radial outer curved path, a lateral edge portion of the woven-wire belt adjacent the inner curved path defining an inner edge portion of the woven-wire belt and a lateral edge portion of the woven-wire belt adjacent the outer curved path defining an outer edge portion of the woven-wire belt, comprising:

an elongated rigid metal wire of preselected length, physical characteristics and of substantially uniform gauge, said elongated connector rod wire including locations uniformly-spaced along the length dimension in which metal of said connector rod is laterally-offset from a centrally-located axis of said connector rod, said elongated connected rod wire including a central portion wherein metal at said uniformly-spaced locations, which are centrally located lengthwise of said connector rod, is quantitatively offset substantially uniformly, and said elongated connector rod wire including only one end portion wherein metal of said uniformly spaced locations which are contiguous to the outer edge of said connector rod and correspond to the outer edge portion of the woven wire belt is offset a quantitatively-varying amount in relation to said metal offset at locations which are centrally located lengthwise of said connector rod.

* * * * *